United States Patent
Yamashita

(10) Patent No.: US 7,773,603 B2
(45) Date of Patent: Aug. 10, 2010

(54) PACKET COMMUNICATION SYSTEM AND PACKET COMMUNICATION APPARATUS

(75) Inventor: Yoshiteru Yamashita, Tsushima (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 776 days.

(21) Appl. No.: 11/276,923

(22) Filed: Mar. 17, 2006

(65) Prior Publication Data

US 2006/0215702 A1   Sep. 28, 2006

(30) Foreign Application Priority Data

Mar. 24, 2005   (JP) .............................. 2005-087147

(51) Int. Cl.
*H04L 12/28* (2006.01)
*H04J 3/24* (2006.01)
*H04J 3/16* (2006.01)

(52) U.S. Cl. ..................... 370/395.1; 370/470; 370/474

(58) Field of Classification Search ....................... None
See application file for complete search history.

(56) References Cited

U.S. PATENT DOCUMENTS

| 5,761,406 | A * | 6/1998 | Kobayashi et al. ............. 714/24 |
| 6,078,399 | A * | 6/2000 | Kadota ....................... 358/1.13 |
| 6,308,296 | B1 * | 10/2001 | Sasaki ......................... 714/763 |
| 6,618,378 | B1 * | 9/2003 | Giroux et al. ............ 370/395.1 |
| 6,795,435 | B1 * | 9/2004 | Jouppi et al. ................. 370/394 |
| 7,380,118 | B2 * | 5/2008 | Kuwano et al. ............. 713/155 |
| 2001/0007565 | A1 * | 7/2001 | Weng et al. .................. 370/429 |
| 2002/0061012 | A1 * | 5/2002 | Thi et al. ..................... 370/352 |
| 2002/0145974 | A1 * | 10/2002 | Saidi et al. .................. 370/230 |

(Continued)

FOREIGN PATENT DOCUMENTS

JP   1995254909 A   10/1995

(Continued)

OTHER PUBLICATIONS

Japan Patent Office, Notification of Reasons for Rejection issued in counterpart Patent Application No. JP 2005-087147, mailed Aug. 11, 2009.

(Continued)

*Primary Examiner*—Alpus H Hsu
*Assistant Examiner*—Jessica Clifton
(74) *Attorney, Agent, or Firm*—Baker Botts, LLP.

(57) ABSTRACT

A packet communication system includes a first communication apparatus and a second communication apparatus. The first communication apparatus generates one or more data packets each having its data volume not more than a prescribed data volume, and transmits the generated data packets to the second communication apparatus. The second communication apparatus receives the data packet transmitted from the first communication apparatus, in order of transmission. The first communication apparatus generates the data packets to be transmitted to the second communication apparatus such that one of the data packets to be last transmitted is a short packet having its data volume less than the prescribed data volume, and each of the data packets other than the data packet to be last transmitted has its data volume equal to the prescribed data volume. The second communication apparatus determines whether or not the data packet received each time is a short packet. Thereby, the second communication apparatus can determine that the data packet transmitted last has been received.

4 Claims, 10 Drawing Sheets

U.S. PATENT DOCUMENTS

| | | | |
|---|---|---|---|
| 2002/0161856 A1* | 10/2002 | Pineau et al. | 709/219 |
| 2002/0169904 A1* | 11/2002 | Kamihara et al. | 710/100 |
| 2003/0193691 A1* | 10/2003 | Tanaka et al. | 358/1.16 |
| 2004/0004739 A1* | 1/2004 | Koike et al. | 358/1.16 |
| 2004/0073697 A1* | 4/2004 | Saito et al. | 709/233 |
| 2004/0199702 A1* | 10/2004 | Baba | 710/305 |
| 2004/0258081 A1* | 12/2004 | Hayashi | 370/401 |
| 2005/0031097 A1* | 2/2005 | Rabenko et al. | 379/93.31 |
| 2005/0033877 A1* | 2/2005 | McLeod | 710/33 |
| 2005/0041606 A1* | 2/2005 | Hori et al. | 370/299 |
| 2005/0053095 A1* | 3/2005 | Kato et al. | 370/474 |
| 2005/0083968 A1* | 4/2005 | Chan et al. | 370/466 |
| 2005/0141534 A1* | 6/2005 | Kawabata et al. | 370/411 |
| 2005/0152685 A1* | 7/2005 | Sako et al. | 386/111 |
| 2005/0246455 A1* | 11/2005 | Bhesania et al. | 710/10 |
| 2005/0246564 A1* | 11/2005 | Bhesania et al. | 713/320 |
| 2005/0246723 A1* | 11/2005 | Bhesania et al. | 719/321 |
| 2005/0273541 A1* | 12/2005 | Hayenga et al. | 710/305 |
| 2006/0069800 A1* | 3/2006 | Li | 709/232 |
| 2006/0215702 A1* | 9/2006 | Yamashita | 370/474 |
| 2006/0280204 A1* | 12/2006 | Nagata et al. | 370/473 |
| 2007/0022204 A1* | 1/2007 | Moch et al. | 709/230 |

FOREIGN PATENT DOCUMENTS

| | | |
|---|---|---|
| JP | 2002-199238 A | 7/2002 |
| JP | 2003-091498 A | 3/2003 |
| JP | 2003-242103 A | 8/2003 |

OTHER PUBLICATIONS

Japan Patent Office; Notice of Decision for Final Rejection in Japan Patent Application No. 2005-087147 (counterpart to the above-captioned U.S. patent application) mailed Jan. 26, 2010 (abridged translation).

Japan Patent Office; Notice of Reasons for Rejection in Japan Patent Application No. 2005-087147 (counterpart to the above-captioned U.S. patent application) mailed Nov. 4, 2009 (abridged translation).

* cited by examiner

PACKET COMMUNICATION SYSTEM AND PACKET COMMUNICATION APPARATUS

BACKGROUND OF THE INVENTION

1. Field of the Invention

The present invention relates to a packet communication system and a packet communication apparatus.

2. Description of Related Art

Methods for transmitting/receiving communication data include packet communication methods in which the communication data is transmitted/received in a state of being divided into a plurality of data packets each having a prescribed volume of data. In the packet communication methods, the communication data is restored after all of the data packets constituting the communication data have been received. For this purpose, JP-A-7-254909 discloses, for example, in FIG. 2, a technique in which the receiving-side apparatus includes a reception check counter for counting the number of data packets received, and the number counted by the reception check counter is monitored to determine whether or not all data packets have been received.

According to the above technique, the receiving-side apparatus must include the reception check counter and a circuit for monitoring the reception check counter. However, in the case of receiving a large amount of data, such as image data, the reception check counter must be large in circuit construction because a huge number of data packets must be received. In addition, the circuit for monitoring the reception check counter must bear a great burden.

SUMMARY OF THE INVENTION

An object of the present invention is to provide a packet communication system and a packet communication apparatus, in which it can be determined in a simple construction whether or not all data packets have been received.

According to a first aspect of the present invention, a packet communication system comprises a first communication apparatus and a second communication apparatus. The first communication apparatus generates data packets, and transmits the data packets to the second communication apparatus. The second communication apparatus receives the data packets transmitted from the first communication apparatus. The first communication apparatus comprises a packet generating section and a data transmitting section. The data generating section generates the data packets such that one of the data packets to be last transmitted has its data volume less than a prescribed data volume, and each of the data packets other than the data packet to be last transmitted has its data volume equal to the prescribed data volume. The data transmitting section transmits the data packets generated by the packet generating section to the second communication apparatus. The second communication apparatus receives the data packets transmitted from the first communication apparatus; and determines whether or not the data packet having its data volume less than the prescribed data volume has been received.

According to a second aspect of the present invention, a packet communication apparatus receives a plurality of data packets. The data packets consist of one or more data packets each having its data volume equal to a prescribed data volume, and a last transmitted data packet having its data volume less than the prescribed data volume. The apparatus receives the data packets and determines whether or not the apparatus has received the data packet having its data volume less than the prescribed data volume.

According to a third aspect of the present invention, a packet communication apparatus comprises a data receiving section, a reading section, and a controlling section. The data receiving section receives one or more data packets each having its data volume equal to a prescribed data volume and a last transmitted data packet having its data volume less than the prescribed data volume; and stores the data packets. The reading section reads out the data packets stored in the data receiving section. The controlling section sends to the reading section a signal to instruct the reading section to end the reading operation for the data packets. The data receiving section comprises a memory, a determiner, and a signal generator. The memory stores therein the data packets received by the data receiving section. The determiner determines whether or not the data receiving section has received the data packet having its data volume less than the prescribed data volume; and whether or not the reading section has read out from the memory the data packet having its data volume less than the prescribed data volume. The signal generator generates an interrupt signal to the controlling section when the determiner determines that the data receiving section has received the data packet having its data volume less than the prescribed data volume, and the reading section has read out from the memory the data packet having its data volume less than the prescribed data volume. When the controlling section receives the interrupt signal, the controlling section sends to the reading section a signal to instruct the reading section to end the reading operation for the data packets.

According to the first aspect of the present invention, the data packet to be last transmitted from the first communication apparatus is always a short packet having its data volume less than the prescribed data volume. Thus, in a simple construction in which the second communication apparatus determines that the short packet has been received, the second communication apparatus can determine that all data packets have been received. Consequently, because the second communication apparatus need not have a counter circuit for counting the number of data packets received, or the like, this makes the circuit construction simple. Further, because there is no necessity of monitoring the number of data packets received, this can reduce the burden on the circuit. According to the second and third aspects of the present invention, a packet communication apparatus can be realized that can determine that all data packets have been received, in a simple construction that the apparatus determines that the short packet has been received. According to the second and third aspects, because the apparatus need not have a counter circuit for counting the number of data packets received, or the like, this makes the circuit construction simple. Further in the packet communication apparatus, because there is no necessity of monitoring the number of data packets received, this can reduce the burden on the circuit.

BRIEF DESCRIPTION OF THE DRAWINGS

Other and further objects, features and advantages of the invention will appear more fully from the following description taken in connection with the accompanying drawings in which.

DESCRIPTION OF THE PREFERRED EMBODIMENTS

First Embodiment

A first embodiment of the present invention will be described with reference to drawings. This embodiment is an example in which a packet communication system of the present invention is applied to transmission of printing data from a personal computer (PC) to a printer.

Figure 1:
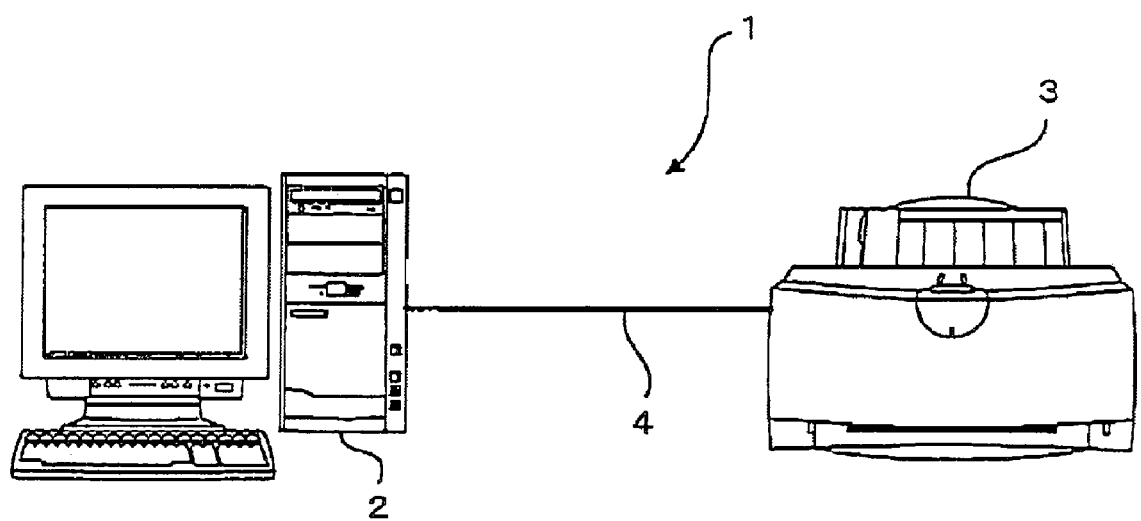
FIG. 1 is a view showing a general construction of a packet communication system according to a first embodiment of the present invention.

FIG. 1 is a view showing a general construction of a packet communication system 1 according to this embodiment. As shown in FIG. 1, the packet communication system 1 includes a personal computer (PC) 2 as a first communication apparatus; and a printer 3 as a second communication apparatus. Either of the PC 2 and the printer 3 has therein a USB interface. The PC 2 and the printer 3 can make communication with each other through a USB cable 4 interconnecting the interfaces. In the PC 2, there have been installed various kinds of application software programs for making printing data, and a driver software program for controlling the printer 3. The printer 3 is a color inkjet printer that performs printing by suitably ejecting inks of magenta (M), yellow (y), cyan (C), and black (k), on a printing paper on the basis of printing data. In accordance with an operation of the PC 2 by a user, printing data made by various application software programs or printing data stored in advance is transmitted to the printer 3, where printing is performed on the basis of the printing data.

Figure 2:
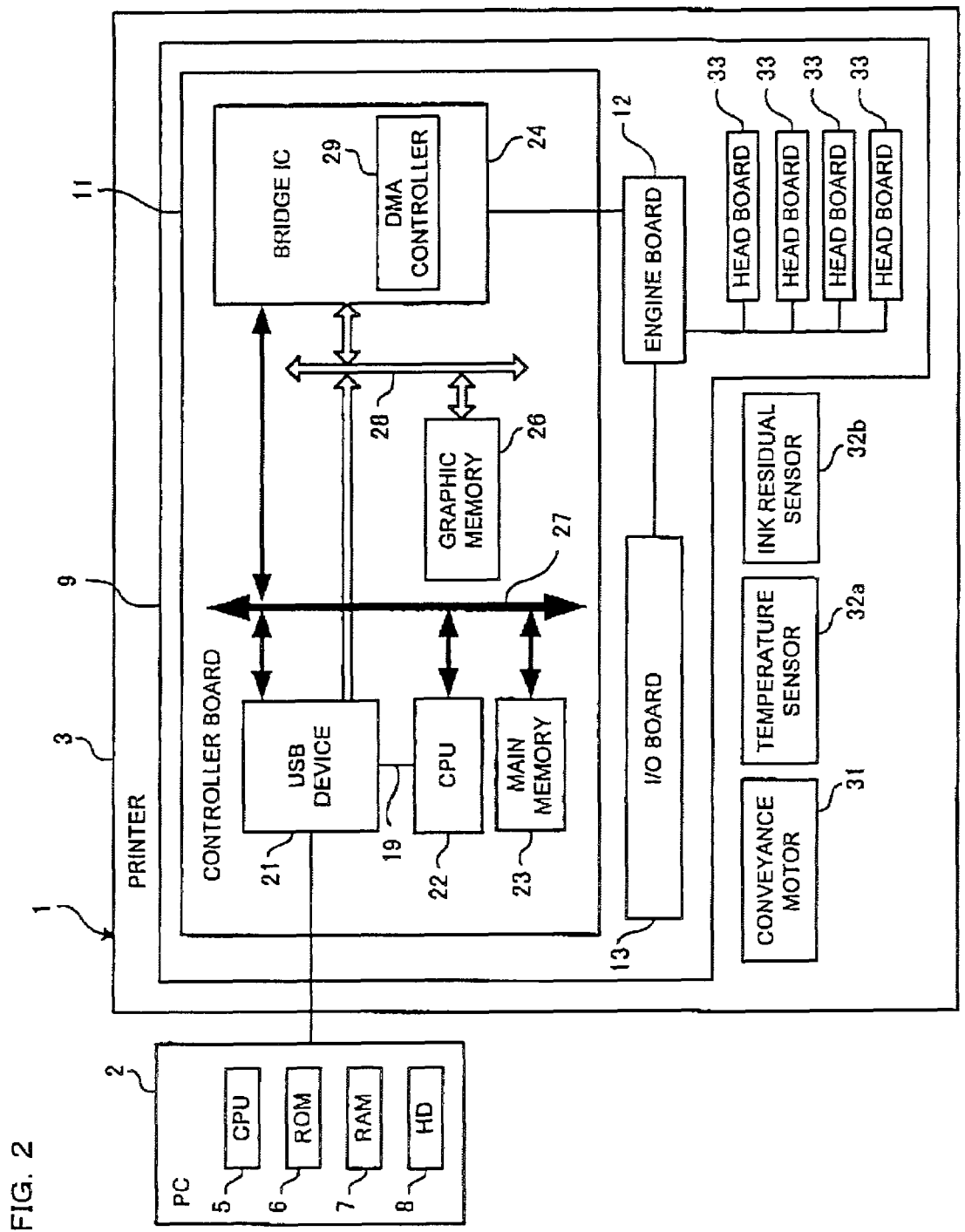
FIG. 2 is a circuit block diagram showing an electrical construction of the packet communication system of FIG. 1.

Next, an electrical construction of the packet communication system 1 of FIG. 1 will be described with reference to FIG. 2. FIG. 2 is a circuit block diagram showing the electrical construction of the packet communication system 1 of FIG. 1. As shown in FIG. 2, the PC 2 includes therein a CPU (Central Processing Unit) 5, a ROM (Read Only Memory) 6, a RAM (Random Access Memory) 7, and an HD (Hard Disk) 8. The CPU 5 is an arithmetic processing unit. The ROM 6 is a nonvolatile memory that stores, as programs, groups of commands that causes the CPU 5 to perform various kinds of processing. The RAM 7 is a volatile memory for temporarily storing data to be used by the CPU 5 in processing. The HD 8 stores files of the operating system (OS) that causes the PC 2 to operate, files of various application software programs that operate on the OS, and files of the driver software program to control the printer 3. The HD 8 further stores printing data that causes the printer 3 to print.

The printer 3 includes therein a control unit 9 that controls the operation of the printer 3; a conveyance motor 31 to drive a not-shown conveyance mechanism for conveying a printing paper; not-shown four inkjet heads that eject ink onto the printing paper being conveyed by the conveyance mechanism; temperature sensors 32a to monitor the temperatures of the respective inkjet heads; and ink residual sensors 32b to monitor the ink residuals of not-shown ink tanks of the respective inkjet heads. The control unit 9 includes therein a controller board 11, an engine board 12, an I/O board 13, and a head board 33. The controller board 11 is a circuit board to control each of control signals of the engine board 12, the I/O board 13, and the head board 33, in accordance with contents of control. The controller board 11 has thereon a USE device 21, a CPU 22, a main memory 23, a bridge IC 24, and a graphic memory 26. The USB device 21, the CPU 22, the main memory 23, and the bridge IC 24, are connected to each other through a local bus 27. The USB device 21, the bridge IC 24, and the graphic memory 26, are connected to each other through a separated bus 28 independent of the local bus 27.

The USB device 21 is an interface device for making packet communication according to the USB standard. In this embodiment, the USB device 21 exchanges various kinds of commands and printing data with the PC 2 as the other party of communication. In this embodiment, a bulk transfer mode according to the USB standard is used for transmitting/receiving printing data. Such a bulk transfer mode is used for transmitting/receiving a relatively large amount of data, in which data packets each having a prescribed data volume, for example, 512 bytes in this embodiment, are sequentially transmitted/received.

Figure 3:
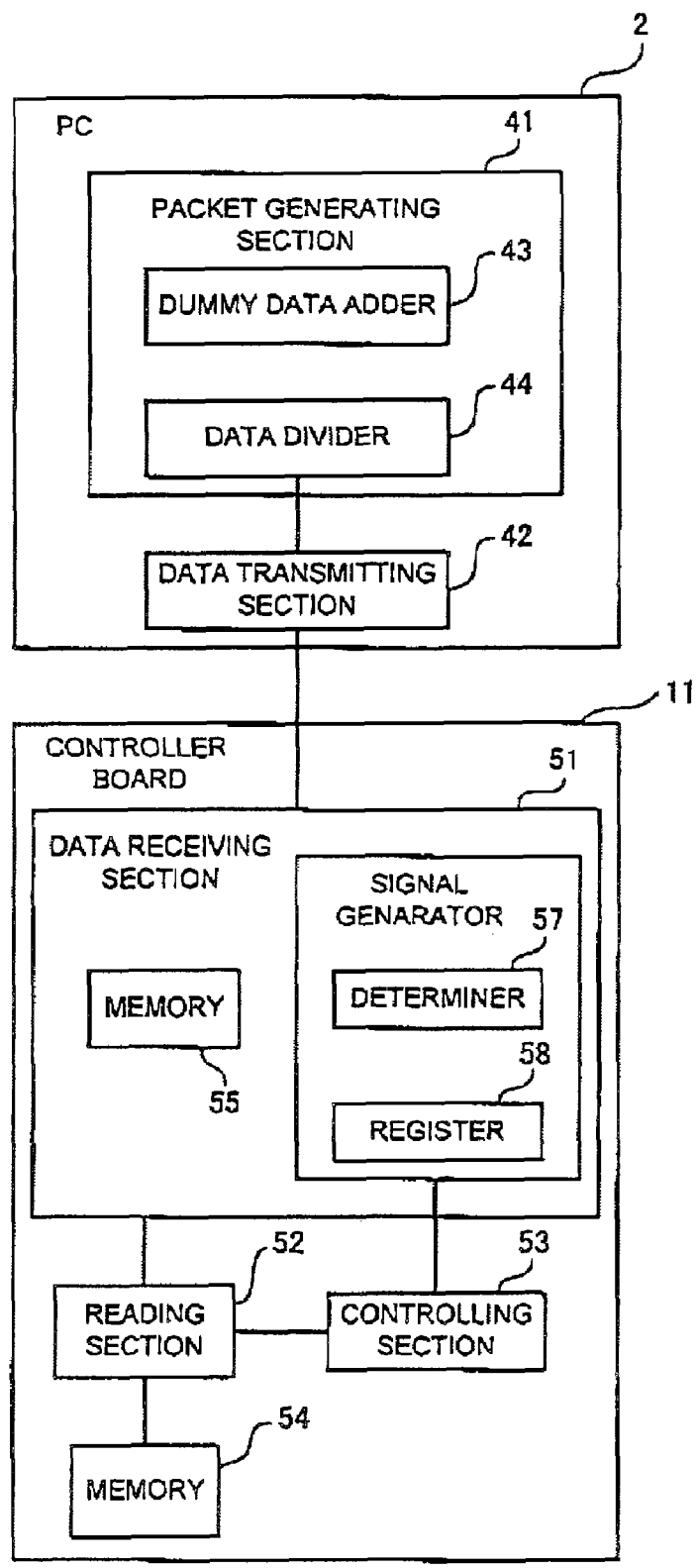
FIG. 3 is a block diagram showing functions of a driver software program of a personal computer and a controller board of a printer, shown in FIG. 2.

The USB device 21 includes therein a register 55, as shown in FIG. 3, to indicate various statuses, such as statuses on reception and management of data packets. The statuses include a status that indicates whether or not a short packet having a data volume less than the prescribed data volume was received in the bulk transfer mode. In the USB device 21, there have been constructed circuits to set the contents of the register 58 in accordance with reception statuses of data packets. For example, the USB device 21 includes therein a circuit to set, when a short packet was received, the contents of a status being stored in the register 59, so as to indicate that a short packet has been received. In the USB device 21, there has been also constructed a circuit to output a short packet reception signal by referring to the status in the register 58. An output signal terminal for outputting the short packet reception signal is connected to an interrupt signal input terminal of the CPU 22 through interrupt wiring 19.

The CPU 22 is a one-chip microcomputer to control the control unit 9. The CPU 22 gives instructions such that data is transferred between sections constituting the control unit 9 in accordance with functions peculiar to the sections. The CPU 22 includes therein an arithmetic processor, a ROM, and a RAM. The main memory 23 is for temporarily storing data generated when the CPU 22 performs processing for calculation or instruction. The bridge IC 24 follows an instruction of the CPU 22 to transfer data between memories of the control unit 9. The bridge IC 24 includes therein a DMA (Direct Memory Access) controller 29. The bridge IC 24 is connected to the engine board 12, and further connected to the I/O board 13 through the engine board 12. The DMA controller 29 transfers data from a memory of the USB device 21 to the graphic memory 26 through the separated bus 28. Thereby, the CPU 22 is released from a direct work for data transfer. In addition, because the data is transferred through the separated bus 28, this data transfer never interrupts the local bus 27 that is used for transferring data to be processed by the CPU 22. The graphic memory 26 is for storing data transferred by the DMA controller 29 from the USB device 21. The data to be stored in the graphic memory 26 is printing data to be printed by the printer 3.

The engine board 12 is a circuit board to make control, for example, associated with drive of not-shown inkjet heads, and it is connected to four head boards 33. In accordance with the contents of an instruction input from the CPU 22 via the bridge IC 24, the engine board 12 generates control signals for controlling the head boards 33, and outputs the generated control signals to the respective head boards 33. On the basis of the control signals from the engine board 12, each head board 33 generates a driving signal for driving the corresponding inkjet head. The generated driving signal is input to an actuator for driving the inkjet head. Thereby, the inkjet head ejects ink. In accordance with the contents of an instruction input from the CPU 22 via the bridge IC 24 and the engine board 12, the I/O board 13 generates a driving signal for driving the conveyance motor 31, and inputs the generated driving signal to the conveyance motor 31. The contents of input signals from various sensors, such as the temperature sensors 23a and the ink residual sensors 32b, can be referred to by the CPU 22 through the bridge IC 24 and the engine board 12.

Next, functions realized in this embodiment will be described in more detail with reference to FIG. 3. The functions as will be described below are realized by adequate combination of functions of the CPUs 5 and 22, various kinds of memories, the controller board 11, and so on, constituting the PC 2 and the printer 3, as described above. The sections shown in FIG. 3, such as a packet generating section 41 and a data receiving section 51, correspond to different hardware blocks, respectively. FIG. 3 is a block diagram of the packet communication system 1 shown in FIG. 2. By activating in the PC 2 the driver software for the printer 3, a packet generating section 41 and a data transmitting section 42 are realized as shown in FIG. 3. The packet generating section 41 generates data packets to be used for transmission of printing data to the printer 3. As described above, a data packet is a unit of data to be transmitted in packet communication, and each data packet has its data volume not more than the prescribed data volume, for example, 512 bytes in the case of USB high-speed bulk transfer.

The packet generating section 41 includes therein a dummy data adder 43 and a data divider 44. The dummy data adder 43 and the data divider 44 will be described with reference to FIGS. 4A to 4D. FIGS. 4A to 4D show processes of division of printing data into data packets by the packet generating section 41. FIGS. 4A and 4B show a case wherein printing data of bytes indivisible by 512 is divided into data packets; and FIGS. 4C and 4D show a case wherein printing data of bytes divisible by 512 is divided into data packets. As shown in FIGS. 4A and 4C, the dummy data adder 43 adds dummy data having a certain volume of data, to the tail end of printing data. As shown in FIGS. 4B and 4D, the data divider 44 divides the printing data to which the dummy data adder 43 has added the dummy data, by the prescribed data volume in order from the leading end of the printing data to generate data packets.

In this embodiment, the prescribed data volume is 512 bytes. Further in this embodiment, the dummy data adder 43 always adds the same volume of dummy data. The volume of dummy data is set such that the last data packet generated by the data divider 44 always has its data volume less than the prescribed data volume. In the case that the amount of data varies from one transmission of printing data to another transmission of printing data, however, the last data packet generated by the data divider 44 adding the same volume of dummy data does not always have its data volume less than the prescribed data volume. Therefore, this embodiment is on the assumption that the amount of printing data is such that the last data packet generated by the data divider 44 adding the same volume of dummy data can always have its data volume less than the prescribed data volume.

For example, the above assumption is satisfied by a case wherein the amount of printing data is always integral times larger than 512 bytes. In this case, by adding dummy data having its data volume less than 512 bytes, the total bytes of the original printing data and the dummy data can always be indivisible by 512 even when the amount of printing data varies from one transmission of printing data to another transmission of printing data. That is, when printing data to which such dummy data has been added is divided into data packets by 512 bytes as the prescribed data volume, the volume of the last generated data packet is always less than 512 bytes Thus, irrespective of the amount of printing data, the last generated data packet is a short packet having its data volume less than 512 bytes as the prescribed data volume; and the other data packets are full packets each having the prescribed data volume.

Thus, by generating data packets in the manner that dummy data is added to the tail end of printing data and the resultant data is divided by the prescribed data volume in order from the leading end of the printing data, the data packets can easily be generated in which the data packet to be transmitted last is always a short packet. In addition, because the volume of dummy data is always the same irrespective of the amount of printing data, this makes it easier to generate such a short packet. In another case, such dummy data may be added to the leading end of printing data. In accordance with whether the dummy data is added to the leading or tail end of printing data, the position of the border between the dummy data and the printing data varies between a position near the first data packet and a position near the last data packet. The printer 3 of this embodiment is constructed so as to process received printing data on the basis that the position of the border between the dummy data and the printing data is near the first data packet when the dummy data was added to the leading end of the printing data; and near the last data packet when the dummy data was added to the tail end of the printing data.

The data transmitting section 42 transmits to the printer 3 data packets generated by the packet generating section 41, in order from the first generated data packet. At this time, the last one of the data packets for the printing data to be transmitted by the data transmitting section 42, is always a short packet. When transmitting printing data, the data transmitting section 42 exchanges signals with the printer 3 according to a predetermined protocol.

Next, the controller board 11 of the printer 3 will be described. As shown in FIG. 3, the controller board 11 includes a controlling section 53, a data receiving section 51, a reading section 52, and a memory 54. The controlling section 53 is a functional component to be realized by the CPU 22 and the main memory 23. The controlling section 53 sends to the data receiving section 51 signals to permit the data receiving section 51 to transmit and send signals. Accordingly, the data receiving section 51 transmits to the PC 2 a signal for start of data transfer, and sends to the reading section 52 a signal to request the reading section 52 to read. The controlling section 53 performs reading end processing when the reading section 52 finishes reading a short packet. That is, the controlling section 53 sends reading end signals to the respective data receiving section 51 and reading section 52. The data receiving section 51 that has received the reading end signal determines that reception processing for printing data of this time has completed; and waits for receiving printing data of the next time. The reading section 52 that has received the reading end signal determines that the transfer of printing data received this time has completed; and waits for transfer of printing data of the next time.

The data receiving section 51 is a functional component to be realized by the USB device 21 to receive data packets transmitted from the PC 2. The data receiving section 51 includes therein a memory 55 and a signal generator 56. The memory 55 temporarily stores data packets received by the data receiving section 51.

The signal generator 56 informs the controlling section 53 that the data receiving section 51 has received all the data packets for printing data. The signal generator 56 includes therein a register 58 and a determiner 57. The register 58 stores therein a status of the data receiving section 51. As described above, the register 58 is built in the USB device 21. The contents of the statuses of the data receiving section 51 include the content indicating whether or not the data receiving section 51 has received a short packet; and the content indicating whether or not the short packet has been read out from the memory 55. The determiner 57 refers to the storage contents of the register 58 to determine whether or not the data receiving section 51 has received a short packet, and whether or not the short packet has been read out from the memory 55. When the determiner 57 determines that the data receiving section 51 has received a short packet and the received short packet has been read out from the memory 55, the determiner 57 then determines that the data receiving section 51 has received all the data packets for printing data and the reading section 52 has read all the data packets The signal generator 56 then informs the control section 53 of that determination. More specifically, the signal generator 56 outputs a reading end signal as an interrupt signal to the CPU 22 through the interrupt wiring 19. The controlling section 53 that has received the information performs reading end processing.

The reading section 52 is a functional component to be realized by the DMA controller 29 of the bridge IC 24. When the reading section 52 receives a data reading request signal sent by the data receiving section 51 when the data receiving section 51 has received one data packet, the reading section 52 reads out the data packet from the memory 55, and sends the read-out data packet to the memory 54, which corresponds to the graphic memory 26, to store therein.

Figure 5:
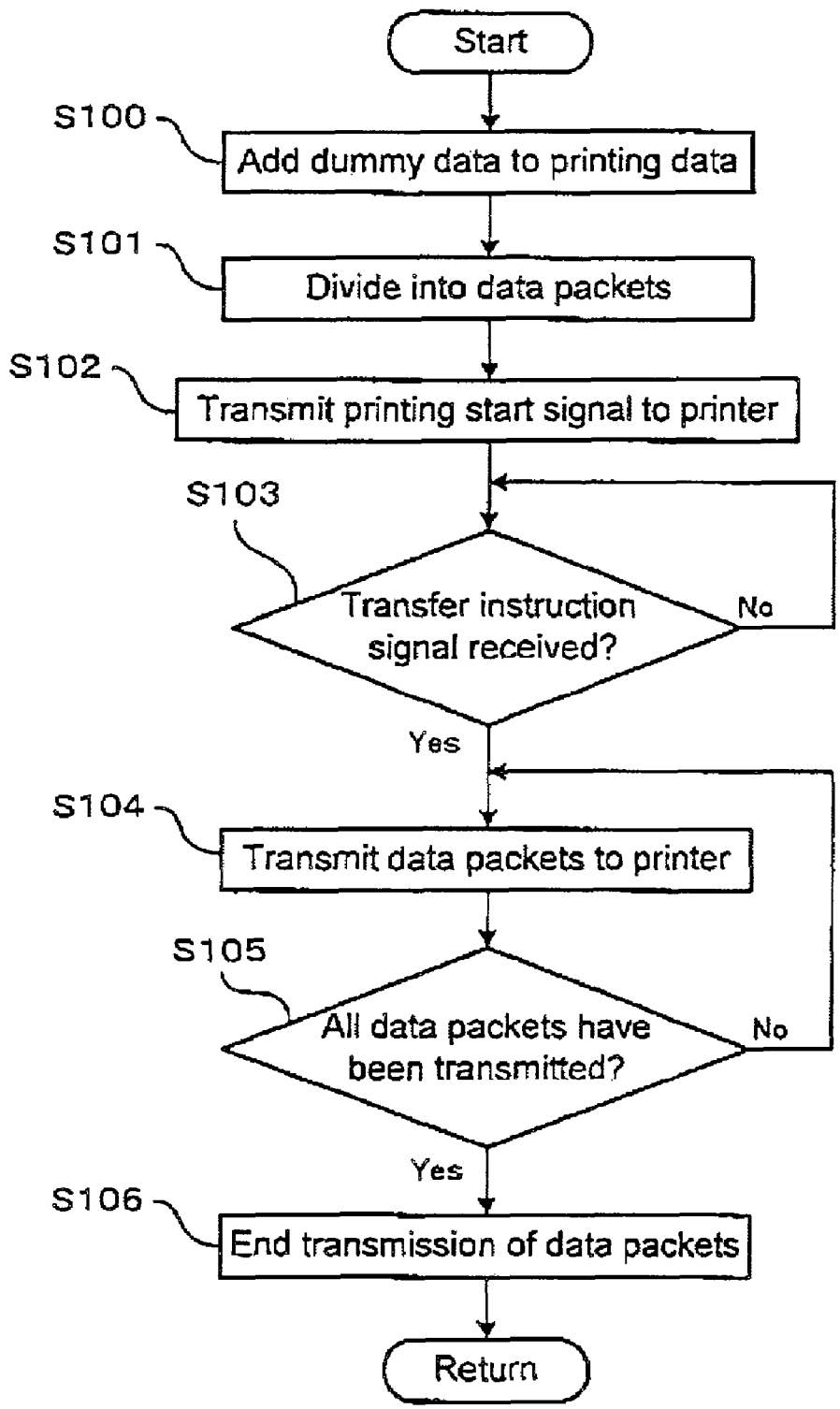
FIG. 5 is a flowchart showing a procedure in the personal computer to transmit printing data from the personal computer to the printer.
Figure 6:
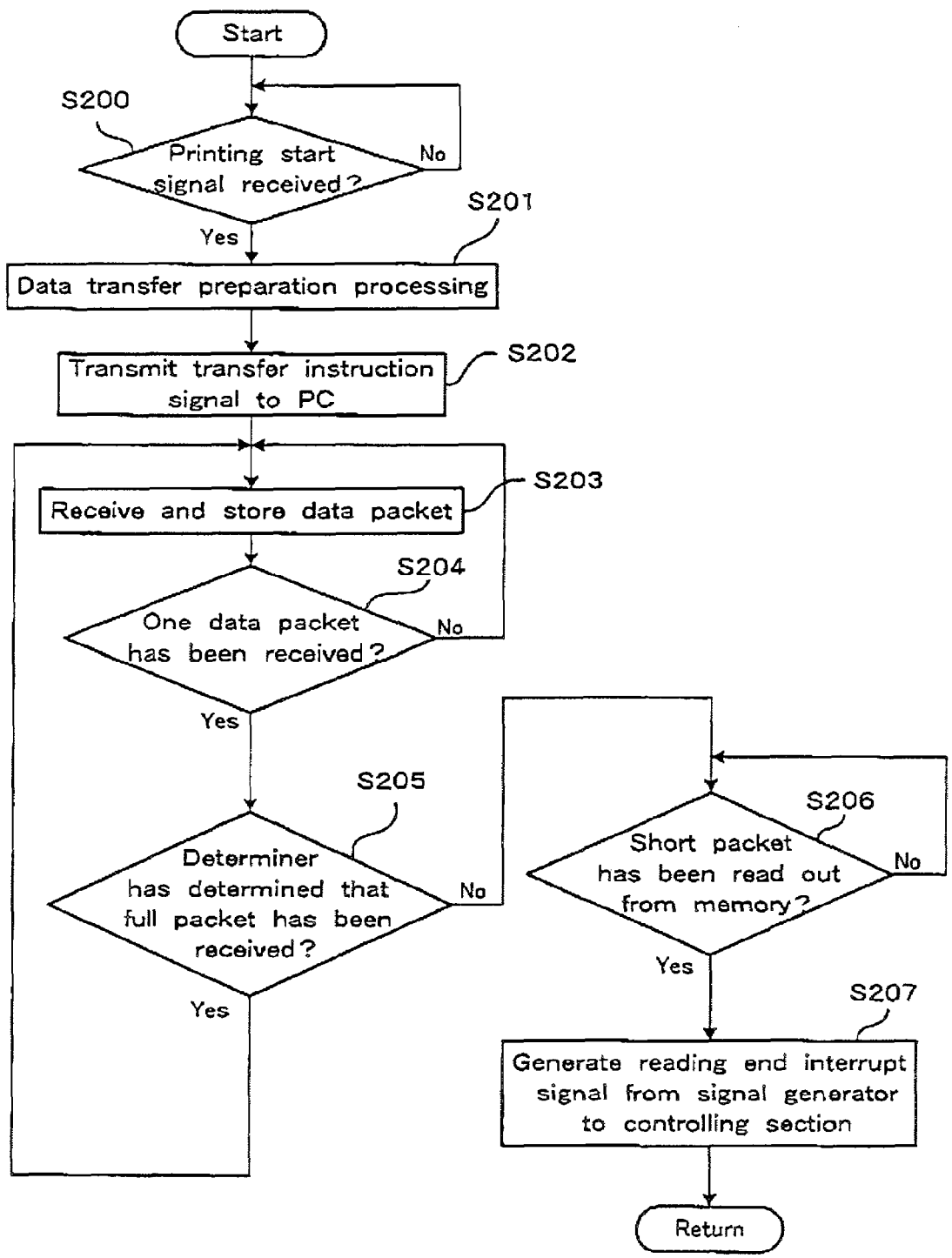
FIG. 6 is a flowchart showing a procedure in a data receiving section and a controlling section for the printing data transmitted from the personal computer to the printer.
Figure 7:
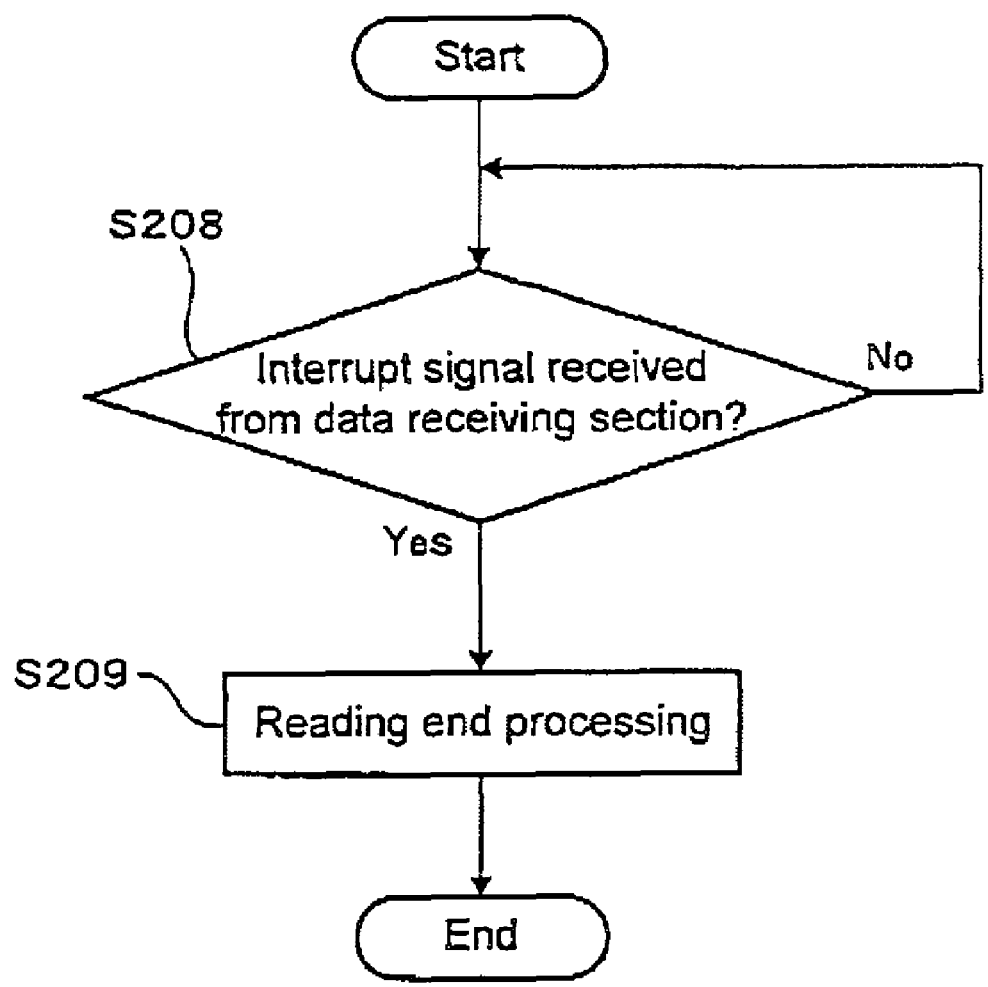
FIG. 7 is a flowchart showing a procedure in the controlling section to be performed in the procedure of FIG. 6.
Figure 8:
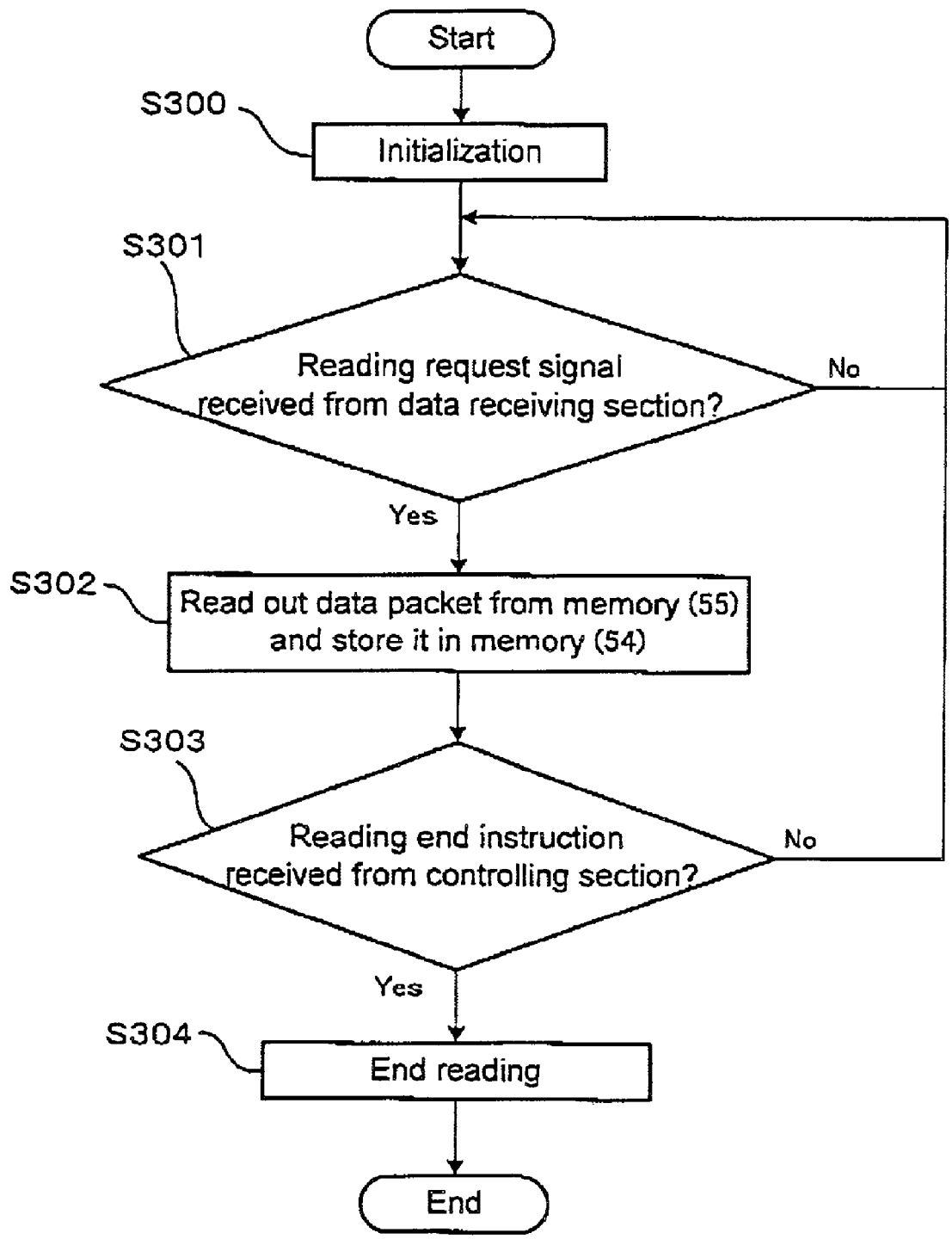
FIG. 8 is a flowchart showing a procedure in a reading section for the printing data transmitted from the personal computer to the printer.

Next, procedures in the packet communication system 1 when the PC 2 transmits printing data to the printer 3 will be described with reference to the flowcharts of FIGS. 5 to 8. FIG. 5 is a flowchart showing a procedure in the PC 2 to transmit printing data. FIG. 6 is a flowchart showing a procedure in the controller board 11 to receive the printing data transmitted from the PC 2. FIG. 7 is a flowchart showing a procedure in the controlling section 53 to perform reading end processing after receiving an interrupt signal from the data receiving section 51. FIG. 8 is a flowchart showing a procedure in the reading section 52 to read the printing data received by the data receiving section 51.

Figure 4:
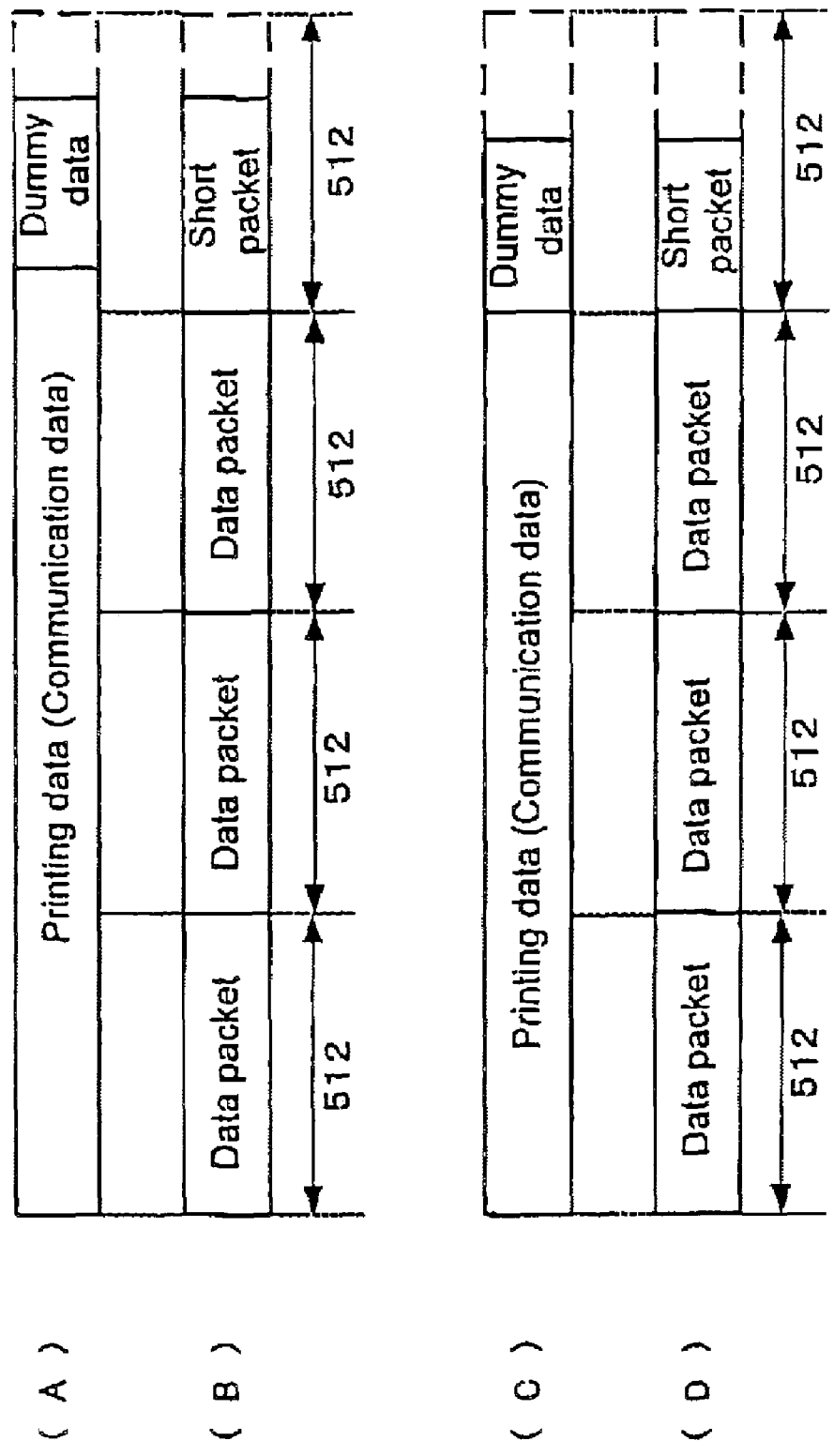
FIGS. 4A to 4D show processes of division of printing data into data packets in the packet communication system of FIG. 1.

When the PC 2 transmits printing data to the printer 3, as shown in FIG. 5, first, the dummy data adder 43 of the PC 2 adds dummy data to the printing data, in Step S100. In Step S101, the data divider 44 divides the printing data to which the dummy data has been added, into a plurality of data packets. At this time, of the plurality of data packets generated by the division, the data packet to be last transmitted is a short packet having its data volume less than 512 bytes; and the other data packets are full packets each having its data volume of 512 bytes, as shown in FIG. 4. In Step S102, to inform the printer 3 that printing be started, the data transmitting section 42 transmits a printing start signal by a control transfer mode as one of USB transfer modes. The control transfer mode is a transfer mode capable of two-way communication, and it is used for transmitting a small amount of data, such as setting data.

The printer 3 that has received the printing start signal transmits to the PC 2 a signal to instruct the PC 2 to start data transfer, in Step S202 of FIG. 6. The PC 2 waits for receiving the data transfer instruction signal from the printer 3, that is, No in Step S103 of FIG. 5. When the PC 2 receives the data transfer instruction signal from the printer 3, that is, Yes in Step S103, the data transmitting section 42 transmits to the printer 3 the plurality of data packets in order from the first data packet by a bulk transfer mode, in Step S104. The data transmitting section 42 repeats the data packet transmission until all data packets have been transmitted, that is, No in Step S105. When the data transmitting section 42 finishes transmitting a short packet at the end and thereby all data packets have been transmitted, that is, Yes in Step S105, the PC 2 completes the transmission of the printing data, in Step S106.

When the controller board 11 of the printer 3 receives the printing data transmitted from the PC 2, as shown in FIG. 6, first, the data receiving section 51 waits for receiving the printing start signal transmitted from the PC 2, see Step S102 of FIG. 5, that is, No in Step S200. When the data receiving section 51 receives the printing start signal transmitted from the PC 2, that is, Yes in Step S200, the data receiving section 51 sends to the controlling section 53 a signal to start data transfer preparation processing. In Step S201, the controlling section that has received the signal performs data transfer preparation processing including, for example, setting of addresses for writing in the memory 54 of the reading section 52. When the data transfer preparation processing is completed, the controlling section 53 sends to the data receiving section 51 a signal indicating that data transfer preparation processing has been completed. In Step S202, the data receiving section 51 that has received the signal transmits to the PC 2 by the control transfer mode a data transfer instruction signal to instruct the PC 2 to start data transmission.

In Step S203, the data receiving section 51 receives one data packet transmitted from the PC 2, see Step S104 of FIG. 5. At this time, because one data packet is transmitted as serial data, the data receiving section 51 stores in the memory 55 the received serial data in order The data receiving section 51 continues receiving serial data until the serial data constituting one data packet has been received, that is, No in Step S204. When the data receiving section 51 finishes receiving the serial data constituting one data packet, that is, Yes in Step S204, the determiner 57 determines in Step S205 whether or not the received data packet is a full packet. When the data receiving section 51 finishes receiving the data constituting one data packet, the register 58 contains therein a status that indicates whether or not the data packet is a full packet. Thus, the determiner 57 makes the above determination by the status contained in the register 58.

When the determiner 57 determines that the received data packet is a full packet, that is, Yes in Step S205, the data receiving section 51 sends a reading request signal to the reading section 52. In addition, the data receiving section 51 receives the next data packet, in Step S203. Thus, the reading operation of the reading section 52 is performed independently of the controlling section 53.

On the other hand, when the determiner 57 determines that the received data packet is not a full packet, that is, it is a short packet, and No in Step S205, the data receiving section 51 sends a reading request signal to the reading section 52, and further the determiner 57 determines in Step S206 whether or not the short packet stored in the memory 55 has been read out by the reading section 52. The register 58 contains therein a status that indicates whether or not the short packet has been read out from the memory 55. Thus, the determiner 57 makes the above determination by the status contained in the register 58.

When the determiner 57 determines that the short packet stored in the memory 55 has not yet been read out, that is, No in Step S206, the signal generator 56 waits until the reading section 52 has read out the short packet stored in the memory 55. When the determiner 57 determines that the short packet stored in the memory 55 has been read out, that is, Yes in Step S206, the signal generator 56 generates in Step S207 an interrupt signal, as a short packet reception signal, that causes the controlling section 53 to perform reading end processing. Afterward, the data receiving section 51 again waits for receiving a printing start signal from the PC 2, that is, No in Step S200. On the other hand, the controlling section 53 is waiting while the data receiving section 51 is receiving a data packet, that is, No in Step S208 of FIG. 7. When the controlling section 53 receives an interrupt signal from the signal generator 56, that is, Yes in Step S208, the controlling section 53 performs reading end processing in Step S209. That is, the controlling section 53 sends reading end signals to the respective reading section 52 and data receiving section 51.

In the reading section 52, as shown in FIG. 8, initialization including the above-described address setting is performed in Step S300 in data transfer preparation processing, see Step S201 of FIG. 6. Afterward, the reading section 52 waits for receiving from the data receiving section 51 a reading request signal to the PC 2, that is, No in Step S301. When the reading section 52 receives a reading request signal from the data receiving section 51, that is, Yes in Step S301, the reading section 52 reads out a data packet stored in the memory 55, and stores it in the memory 54, in Step S302.

Afterward, when the reading section 52 receives from the controlling section 53 no instruction to end the reading operation, that is, No in Step S303, the reading section 52 waits for receiving the next reading request signal from the data receiving section 52, that is, No in Step S301. When the reading section 52 receives from the controlling section 53 an instruction to end the reading operation, that is, Yes in Step S303, the reading section. 52 ends reading in Step S304.

As described above, the controller board 11 receives printing data transmitted from the PC 2, and stores the received printing data in the memory 54. Afterward, the printing data is transferred from the memory 54 to the engine board 12 via the bridge IC 24. On the basis of the transferred printing data, the engine board 12 outputs driving signals to four head boards to drive inkjet heads. In accordance with the driving signals, each inkjet head ejects ink.

According to the above-described first embodiment, because the data packet to be last transmitted from the PC 2 to the printer 3 is a short packet, it can be known by receiving the short packet that the data receiving section 51 has received all data packets. Thus, even without provision of a counter circuit for counting the number of data packets received, or the like, it can be determined whether or not all data packets have been received. As a result, the printer 3 can be simplified in circuit construction. In addition, because there is no necessity of monitoring the number of data packets received, the burden on the controlling section 53 can be reduced.

Because the PC 2 and the printer 3 can be connected to each other by USB, versatilities of them can be increased. The PC 2 adds the same volume of dummy data to any printing data to generate data of bytes indivisible by 512. The PC 2 divides the resultant data by 512 bytes in order from the leading end of the data. In this manner, a short packet having its data volume less than 512 bytes can easily be made. In this embodiment, because the same volume of dummy data is added to any printing data, such a short packet can be made more easily.

When the determiner 57 has determined that a short packet having its data volume less than the prescribed data volume has been read out from the memory 55, the signal generator 56 generates an interrupt signal to the controlling section 53. Thus, the controlling section 53 need not monitor whether or not all data packets have been received. This reduces the burden on the controlling section 53.

After a short packet is received, the signal generator 56 generates an interrupt signal to the controlling section 53 when the determiner 57 determines that the short packet has been read out from the memory 55. Thus, reading end processing can be started after all data packets are surely read out.

Because the signal generator 56 informs the controlling section 53 by an interrupt signal that all data packets have been read out, the controlling section 53 can start reading end processing immediately after all data packets are completely read out. This can increase the speed of communication processing.

Second Embodiment

Next, a second embodiment of the present invention will be described. The second embodiment differs from the first embodiment only in the controlling section 53. Thus, the operation of the controller board 11 concerning the operation of the controlling section 53 will be described.

Figure 9:
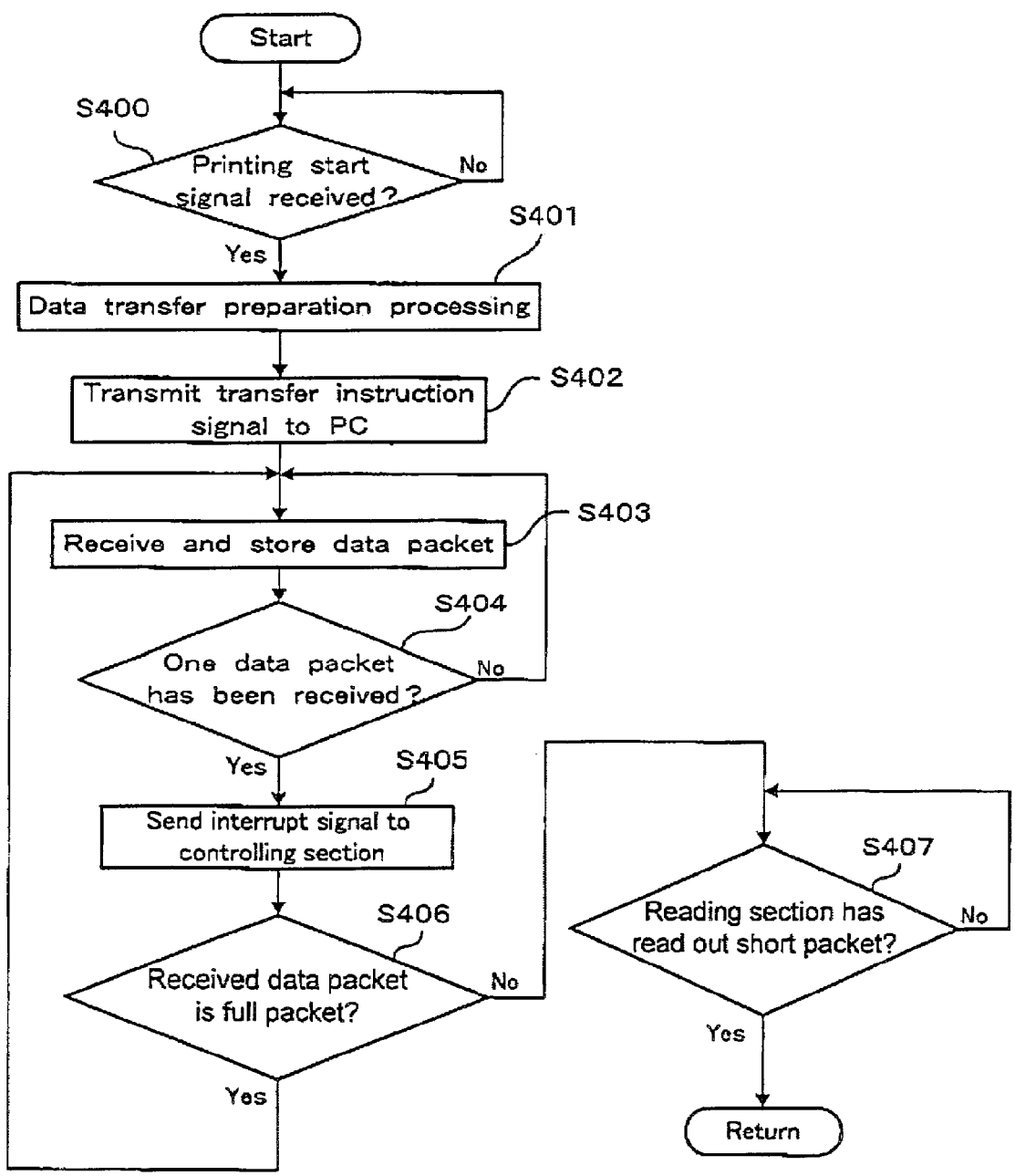
FIG. 9 is a flowchart showing a procedure in a packet communication system according to a second embodiment of the present invention.
Figure 10:
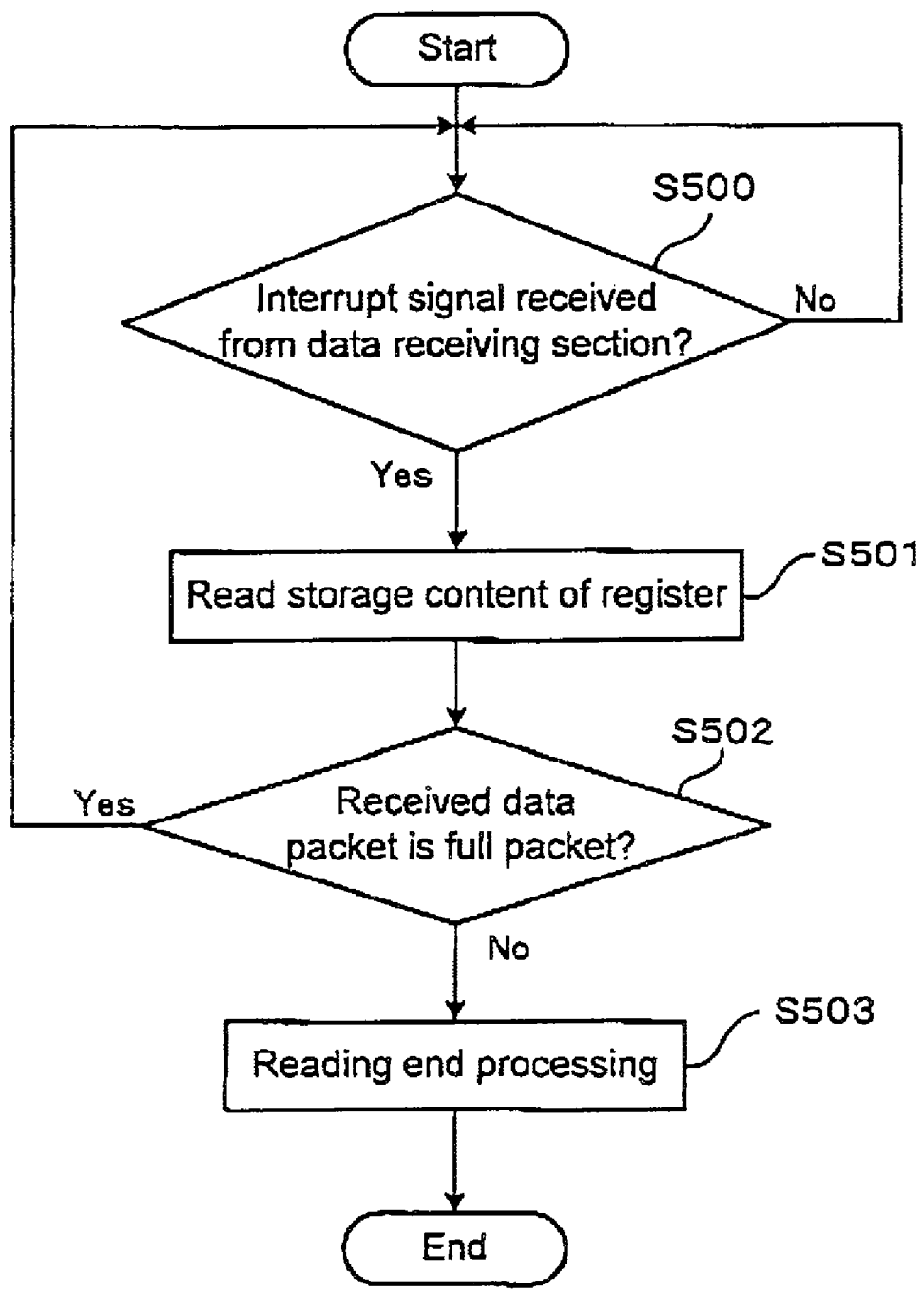
FIG. 10 is a flowchart showing a procedure in the controlling section to be performed in the procedure of FIG. 9.

FIGS. 9 and 10 are flowcharts showing procedures in the controller board 11 of the second embodiment. As shown in FIG. 9, like the first embodiment, when a printing start signal transmitted from the PC 2 is received, that is, Yes in Step S400, data transfer preparation processing is performed in Step S401. When the data transfer preparation processing is completed, a data transfer start signal is transmitted to the PC 2 to instruct the PC 2 to start data transfer, in Step S402. In step S403, a data packet transmitted from the PC 2 is received, and the received data packet is stored in the memory 55. Reception of serial data is repeated until the serial data constituting one data packet has been received, that is, No in Step S404. When the data receiving section 51 finishes receiving the serial data constituting one data packet, that is, Yes in Step S404, the signal generator 56 sends to the reading section 52 a signal to inform the reading section 52 that a data packet has been received. When the reading section 52 finished reading out the data packet, the signal generator 56 further sends to the controlling section 53 a interrupt signal to inform the controlling section 53 that the data packet has been read out, in Step S405.

When the data receiving section 51 finishes receiving the serial data constituting one data packet, the register 58 contains therein a status that indicates whether or not the data packet is a full packet. In Step S406, the determiner 57 determines by the status contained in the register 58 whether or not the received data packet is a full packet. When the received data packet is a full packet, that is, Yes in Step S406, the data receiving section 51 receives the next data packet, in Step S403.

On the other hand, when the received data packet is not a full packet, that is, No in Step S406, the data receiving section 51 waits until the reading section 52 has read out the short packet stored in the memory 55. When the determiner 57 determines that the short packet has been read out, that is, Yes in Step S407, reception of a series of data packets is ended. Afterward, the data receiving section 51 again waits for receiving a printing start signal from the PC 2, that is, No in Step S400.

As shown in FIG. 10, the controlling section 53 is waiting for receiving an interrupt signal, from the signal generator 56, that is, No in Step S500. When an interrupt signal is input from the data receiving section 51, that is, Yes in Step S500, the controlling section 53 reads out the content of a status contained in the register 58, in Step S501. The controlling section 53 thereby determines whether or not the data packet received by the data receiving section 51 is a full packet, in Step S502. When the controlling section 53 determines that the data packet received by the data receiving section 51 is a full packet, that is, it is not a short packet, and Yes in Step S502, processing from Step S500 is repeated. On the other hand, when the controlling section 53 determines that the data packet received by the data receiving section 51 is not a full packet, that is, it is a short packet, and No in Step S502, reading end processing is performed in Step S503 In short, in this embodiment, the controlling section 53 reads out the status contained in the register 58 every time when a data packet is received, and that is repeated until a short packet is received. In addition, when the controlling section 53 determines that a short packet has been received, that is, No in Step S502, reading end processing is performed in Step S503. That is, when the reading-out of the short packet is completed, the controlling section 53 sends reading end signals to the respective reading section 52 and data receiving section 51.

According to the above-described second embodiment, because the data packet to be last transmitted from the PC 2 to the printer 3 is a short packet, it can be known by receiving the short packet that the data receiving section 51 has received all data packets. Thus, even without provision of a counter circuit for counting the number of data packets received, or the like, it can be determined whether or not all data packets have been received. As a result, the printer 3 can be simplified in circuit construction. In addition, because there is no necessity of monitoring the number of data packets received, the burden on the controlling section 53 can be reduced.

After the data receiving section 51 has received a short packet, the controlling section 53 inquires at the reading section 52 whether or not the reading section 52 has read out the short packet; and the controlling section 53 performs reading end processing after the short packet has been read out. Thus, the reading end processing can be performed after all data packets have been surely received and read out.

In the above-described embodiment, the dummy data adder 43 may have a function of determining whether or not the amount of printing data is divisible by the volume of one data packet; and adding dummy data only when the dummy data adder 43 has determined that the amount of printing data is divisible. That is, the packet generating section 41 may be constructed so as to divide printing data into a plurality of data packets without adding dummy data when the amount of printing data is indivisible by the volume of one data packet. Also in this case, the data packet to be last transmitted from the PC 2 to the printer 3 is always a short packet. Thus, by receiving the short packet, the data receiving section 51 can determined that all data packets have been received. In addition, when a short packet can be generated even by dividing printing data into data packets without adding dummy data, the amount of data to be transmitted can be reduced because redundant dummy data is not added. For example, one or both of the amount of printing data and the prescribed data volume may be determined in advance so as to obtain a combination of the amount of printing data and the prescribed data volume such that the amount of printing data is indivisible by the prescribed data volume.

In the first and second embodiments, the same volume of dummy data is added to any printing data. However, the present invention is not limited to that. In a modification, a different volume of dummy data packet may be added in accordance with the amount of printing data. Also in the modification, a short packet can be generated by adding a different volume of dummy data in accordance with the amount of printing data. In addition, the packet generating section 41 may have a construction in which the volume of one data packet can be freely selected in accordance with the amount of printing data so that a short packet can be generated even when there is no assumption that a predetermined volume of dummy data exists that causes the last generated data packet to be always a short packet.

In the first and second embodiments, the PC 2 and the printer 3 are connected to each other by USB. However, the present invention is not limited to that. In a modification, the PC 2 and the printer 3 may be connected to each other by another standard capable of packet communication. Also in the modification, data can be transferred from the PC 2 to the printer 3 in the manner described in the first and second embodiments.

In the first and second embodiments, printing data is transferred from the PC 2 to the printer 3. However, the present invention is not limited to that. The present invention is applicable also to packet communication systems for transferring data other than printing data. In addition, the present invention is applicable also to systems for exchange data between apparatuses other than personal computers and printers.

In the first and second embodiments, the signal generator and the determiner are constructed as parts of sections. However, they may be constructed on any portions of the controller board. In addition, they may be provided in a hierarchical construction different from that of the first and second embodiments.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A packet communication system comprising:
a first communication apparatus that generates data packets and transmits the generated data packets, wherein the first communication apparatus comprises:
a packet generating section that generates the data packets such that a data packet to be last transmitted has a data volume less than a prescribed data volume, and each of the data packets other than the data packet to be last transmitted has a data volume equal to the prescribed data volume, wherein the packet generating section comprises:
a dummy data adder that adds dummy data to an end of communication data to be transmitted, such that the total amount of communication data and dummy data is indivisible by the prescribed data volume, and
a divider that divides the total amount of communication data and dummy data into the data packets;
a data transmitting section that transmits the data packets generated by the packet generating section; and a second communication apparatus that receives the data packets transmitted from the first communication apparatus, wherein the second communication apparatus receives the data packets transmitted from the first communication apparatus, and determines whether the data packet having its data volume less than the prescribed data volume has been received.

2. The system according to claim 1, wherein the dummy data adder adds an equal volume of dummy data to any communication data.

3. A packet communication system comprising:
a first communication apparatus that generates data packets and transmits the generated data packets; and
a second communication apparatus that receives the data packets transmitted from the first communication apparatus,
wherein the first communication apparatus comprises:
a packet generating section that generates the data packets such that a data packet to be last transmitted has a data volume less than a prescribed data volume, and each of the data packets other than the data packet to be last transmitted has a data volume equal to the prescribed data volume, wherein a packet size of each data packet to be transmitted equals the data volume of each respective data packet, and wherein the packet generating section comprises:
a dummy data adder that adds dummy data to an end of communication data to be transmitted, such that the total amount of communication data and dummy data is indivisible by the prescribed data volume, and
a divider that divides the total amount of communication data and dummy data into the data packets; and
a data transmitting section that transmits the data packets generated by the packet generating section,
wherein the second communication apparatus comprises:
a data receiving section that receives the data packets transmitted from the first communication apparatus, and stores the received data packets;
a reading section that reads out the data packets stored in the data receiving section; and
a controlling section that sends to the reading section a signal to instruct the reading section to end the reading operation for the data packets,
wherein the data receiving section comprises:
a memory that stores therein the data packets received by the data receiving section; and
a signal generator that generates an interrupt signal to the controlling section when the data receiving section receives the data packet having its data volume less than the prescribed data volume,
wherein the controlling section sends to the reading section the signal to instruct the reading section to end the reading operation for the data packets, when the controlling section receives the interrupt signal from the data receiving section;
wherein the signal generator comprises a determiner that determines whether or not the data receiving section has received the data packet having its data volume less than the prescribed data volume, and whether or not the reading section has read out from the memory the data packet having its data volume less than the prescribed data volume, and wherein the signal generator generates the interrupt signal when the determiner determines that the data receiving section has received the data packet having its data volume less than the prescribed data volume, and the reading section has read out from the memory the data packet having its data volume less than the prescribed data volume.

4. A packet communication system comprising:
a first communication apparatus that generates data packets and transmits the generated data packets; and
a second communication apparatus that receives the data packets transmitted from the first communication apparatus,
wherein the first communication apparatus comprises:
a packet generating section that generates the data packets such that a data packet to be last transmitted has a data volume less than a prescribed data volume, and each of the data packets other than the data packet to be last transmitted has a data volume equal to the prescribed data volume, wherein a packet size of each data packet to be transmitted equals the data volume of each respective data packet, and wherein the packet generating section comprises:
a dummy data adder that adds dummy data to an end of communication data to be transmitted, such that the total amount of communication data and dummy data is indivisible by the prescribed data volume, and
a divider that divides the total amount of communication data and dummy data into the data packets; and
a data transmitting section that transmits the data packets generated by the packet generating section,
wherein the second communication apparatus comprises:
a data receiving section that receives the data packets transmitted from the first communication apparatus, and stores the received data packets;
a reading section that reads out the data packets stored in the data receiving section; and
a controlling section that sends to the reading section a signal to instruct the reading section to end the reading operation for the data packets,
wherein the data receiving section comprises:
a memory that stores therein the data packets received by the data receiving section; and
a signal generator that generates an interrupt signal to the controlling section every time when the data receiving section receives one data packet,
wherein the signal generator comprises a register that stores therein a status that indicates whether or not the data receiving section has received the data packet having its data volume less than the prescribed data volume, and
wherein the controlling section refers to the register when the controlling section receives the interrupt signal from the signal generator; determining whether or not the register stores therein the status that indicates that the data receiving section has received the data packet having its data volume less than the prescribed data volume; and sends to the reading section a signal to instruct the reading section to end the reading operation for the data packets, when the controlling section decides that register stores therein the status.

* * * * *